(12) United States Patent
Barmichev et al.

(10) Patent No.: US 9,045,011 B2
(45) Date of Patent: Jun. 2, 2015

(54) CONTROLLED LANDING GEAR TIRE TRACTION SYSTEM

(75) Inventors: Sergey Barmichev, Kirkland, WA (US); Kelly L. Boren, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 239 days.

(21) Appl. No.: 13/556,211

(22) Filed: Jul. 24, 2012

(65) Prior Publication Data

US 2014/0027571 A1    Jan. 30, 2014

(51) Int. Cl.
*B64C 25/32*    (2006.01)
*B60C 11/16*    (2006.01)
*B64C 25/36*    (2006.01)

(52) U.S. Cl.
CPC ....... *B60C 11/1612* (2013.04); *Y10T 29/49492* (2015.01); *B64C 25/36* (2013.01); *B60C 11/1606* (2013.04)

(58) Field of Classification Search
CPC .. B64C 25/34; B64C 11/1606; B64C 11/1612
USPC ............. 152/208, 210, 158, 520; 244/103 R, 244/100 R, 107
See application file for complete search history.

(56) References Cited

U.S. PATENT DOCUMENTS

| | | | |
|---|---|---|---|
| 2,217,122 A | 10/1940 | Lowry | |
| 2,491,491 A | 12/1949 | Freygang et al. | |
| 3,250,310 A | 5/1966 | Johnson | |
| 3,340,921 A * | 9/1967 | Garfinkle | 152/208 |
| 3,516,466 A * | 6/1970 | Smit | 152/208 |
| 3,672,421 A | 6/1972 | Anderson et al. | |
| 3,712,358 A * | 1/1973 | Einarsson | 152/208 |
| 3,872,908 A * | 3/1975 | Einarsson | 152/208 |
| 3,942,572 A | 3/1976 | Crandall | |
| 4,650,115 A * | 3/1987 | Fontaine | 238/14 |
| 5,609,700 A | 3/1997 | West | |
| 5,660,653 A * | 8/1997 | Gardetto | 152/520 |
| 2007/0079915 A1 | 4/2007 | Jones | |
| 2009/0165912 A1 | 7/2009 | Collette et al. | |
| 2011/0088823 A1 | 4/2011 | Cuny et al. | |

FOREIGN PATENT DOCUMENTS

| | | | | |
|---|---|---|---|---|
| EP | 844108 A1 * | 5/1998 | | B60C 11/16 |
| GB | 1038769 A * | 8/1966 | | |

OTHER PUBLICATIONS

International Search Report and Written Opinion of the International Searching Authority mailed on Sep. 25, 2013 for PCT Application No. PCT/US2013/046829 filed on Jun. 20, 2013—International Searching Authority—European Patent Office.

* cited by examiner

*Primary Examiner* — Christopher P Ellis
*Assistant Examiner* — Jessica Wong
(74) *Attorney, Agent, or Firm* — Ameh IP; Elahe Toosi; Lowell Campbell

(57) ABSTRACT

A landing gear tire traction control system and methods are presented. An outer tire of an aircraft wheel is depressurized to a depressurized state in response to a non-optimal aircraft landing condition. An inner rotor of the aircraft wheel contacts the outer tire in response to the depressurized state, and a plurality of traction studs are deployed to protrude from the outer tire in response to the inner rotor contacting the outer tire.

20 Claims, 8 Drawing Sheets

CONTROLLED LANDING GEAR TIRE TRACTION SYSTEM

FIELD

Embodiments of the present disclosure relate generally to tire traction system design. More particularly, embodiments of the present disclosure relate to landing gear tire traction system design.

BACKGROUND

Various non-optimal conditions may reduce traction on a runway during an aircraft landing. For example, a non-optimal condition may be a wet runway or a runway covered in snow or ice, where the runway comprises a low coefficient of friction (e.g., less that 0.1). Additional conditions such as strong winds and other conditions may also be considered non-optimal. Aircraft antiskid brake control systems and parachutes are generally used for braking; however, such approaches may serve as effective solutions generally only within a tight range of operational conditions. For example, anti-skid systems may be non-optimal in low friction situations, and parachutes may be non-optimal at low speeds.

SUMMARY

A landing gear tire traction control system and methods are presented. An outer tire of an aircraft wheel is depressurized to a depressurized state in response to a non-optimal aircraft landing condition. An inner rotor of the aircraft wheel contacts the outer tire in response to the depressurized state, and a plurality of traction studs are deployed to protrude from the outer tire in response to the inner rotor contacting the outer tire.

Embodiments of the disclosure provide a means for landing gear traction enhancement during landing on contaminated runways. A supplemental braking system described herein may be used in emergency situations such as low traction conditions when conventional brakes on a main landing gear may be ineffective. The supplemental braking system is also applicable to situations when overrunning an end of a runway is unavoidable. Such a condition may occur when landing long with insufficient run out to accommodate normal braking procedures. Alternatively, a condition may occur when less than optimal brake capacity is realized, in which case a crew and aircraft may face a non-optimal situation without this supplemental emergency braking system.

In an embodiment, a method for landing gear tire traction control depressurizes an outer tire of an aircraft wheel to a depressurized state in response to a non-optimal aircraft landing condition. The method further contacts an inner rotor of the aircraft wheel to the outer tire in response to the depressurized state, and deploys a plurality of traction studs to protrude from the outer tire in response to the inner rotor contacting the outer tire.

In another embodiment, a method for forming a landing gear tire traction control system couples an aircraft wheel rim to an outer tire comprising an outer flexible pressurized tube comprising an outer surface operable to contact a landing surface. The method further configures at least one pressure relief valve to depressurize the outer tire to a depressurized state comprising a reduced circumference of the outer tire in response to a depressurization signal. The method further couples an inner rotor to the aircraft wheel rim and inside the outer flexible pressurized tube, the inner rotor is operable to contact the outer tire in response to the depressurized state. The method further configures a plurality of traction studs to protrude from the outer surface of the outer tire in response to the inner rotor contacting the outer tire.

In a further embodiment, a landing gear tire traction system comprises an aircraft wheel rim, an outer tire, at least one pressure relief valve, an inner rotor, and traction studs. The outer tire is coupled to the aircraft wheel rim, and comprises an outer flexible pressurized tube comprising an outer surface operable to contact a landing surface. The pressure relief valve is configured to depressurize the outer tire to a depressurized state comprising a reduced circumference of the outer tire in response to a depressurization signal. The inner rotor is coupled to the aircraft wheel rim and inside the outer flexible pressurized tube, the inner rotor is operable to contact the outer tire in response to the depressurized state. The traction studs are configured to protrude from the outer surface of the outer tire in response to the inner rotor contacting the outer tire.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to landing gear tires, landing gear operation, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, landing gear tire traction of an aircraft. Embodiments of the disclosure, however, are not limited to such aircraft landing gear applications, and the techniques described herein may also be utilized in other applications.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
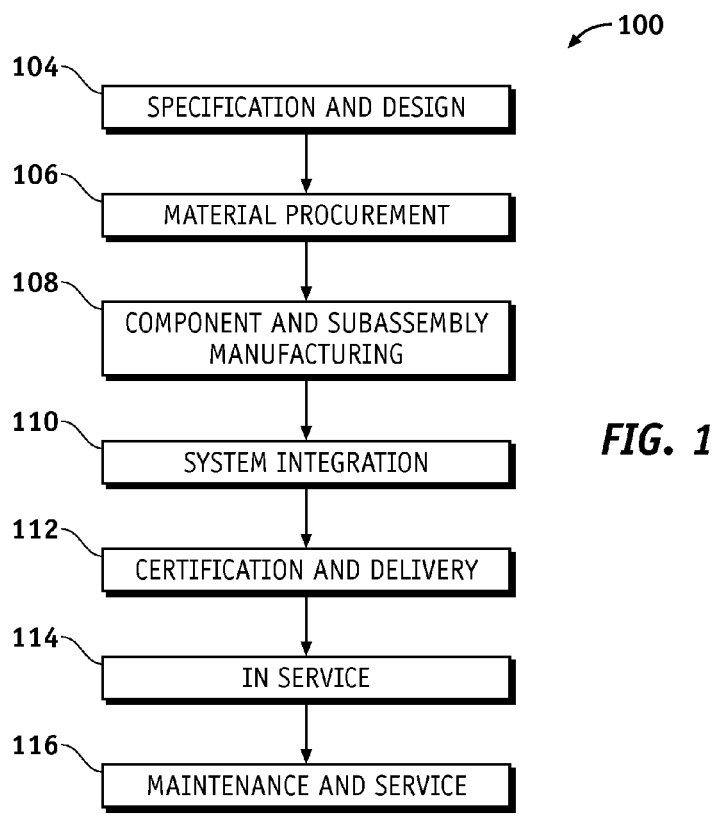
FIG. 1 is an illustration of a flow diagram of an exemplary aircraft production and service methodology.
Figure 2:
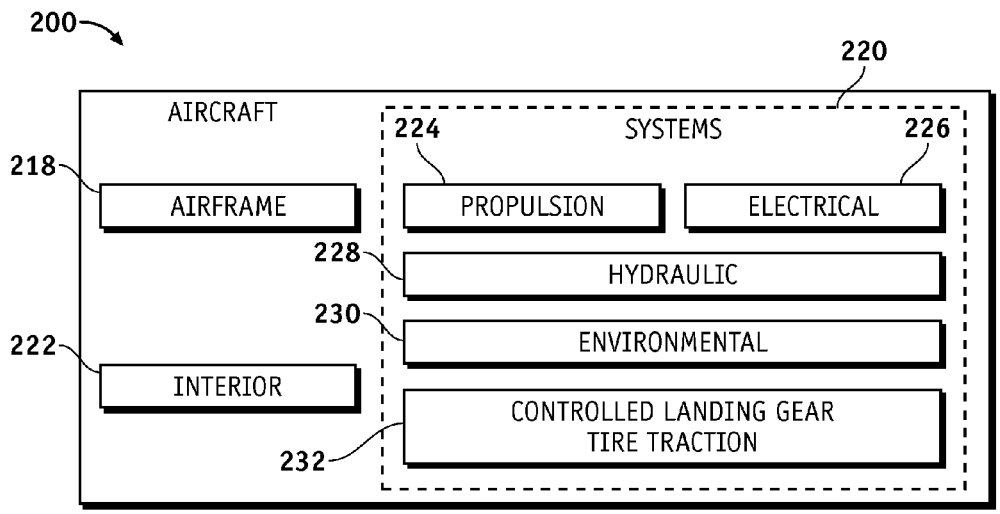
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and integration of system 110 (system integration 110) of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a controlled landing gear tire traction system 232. Any number of other systems may also be included.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

A plurality of traction studs are located inside a material of an outer tire inside of and/or flush relative to a contact surface of the outer tire. The outer tire also comprises a compressible layer located in the outer tire around the traction studs when non-retracted (hidden). An inner rotor is coupled to a wheel rim inside the outer tire. At least one pressure relief valve can decrease pressure in the outer tire, so that the inner rotor engages with an outer tire tread from inside compressing the compressible layer to deploy the traction studs. The inner rotor presses against the outer tire and the traction studs, which contact a runway as the outer tire rolls on the runway. A lower pressure of the outer tire may still stabilize a shell of the outer tire from collapsing.

A needed runway length may be reduced and in some cases a dramatic reduction may be possible. Embodiments of the disclosure prevent a non-optimal aircraft operation, for example, during severe cross-wind conditions combined with low friction runway surface conditions. Under these potential "side skid" conditions, embodiments of the disclosure can prevent an aircraft from unintentionally leaving a side of the runway.

Embodiments of the disclosure may be used in situations other than emergencies. In primitive runway situations or limited risk operations, embodiments of the disclosure may be used to shorten and/or stabilize a landing roll without causing an anomaly to an aircraft, main landing gear, tires etc. Such flights are common for example in scientific field operations in which civilians are supported by military operations (e.g., flying military cargo aircraft into McMurdo Station in Antarctica).

Figure 3:
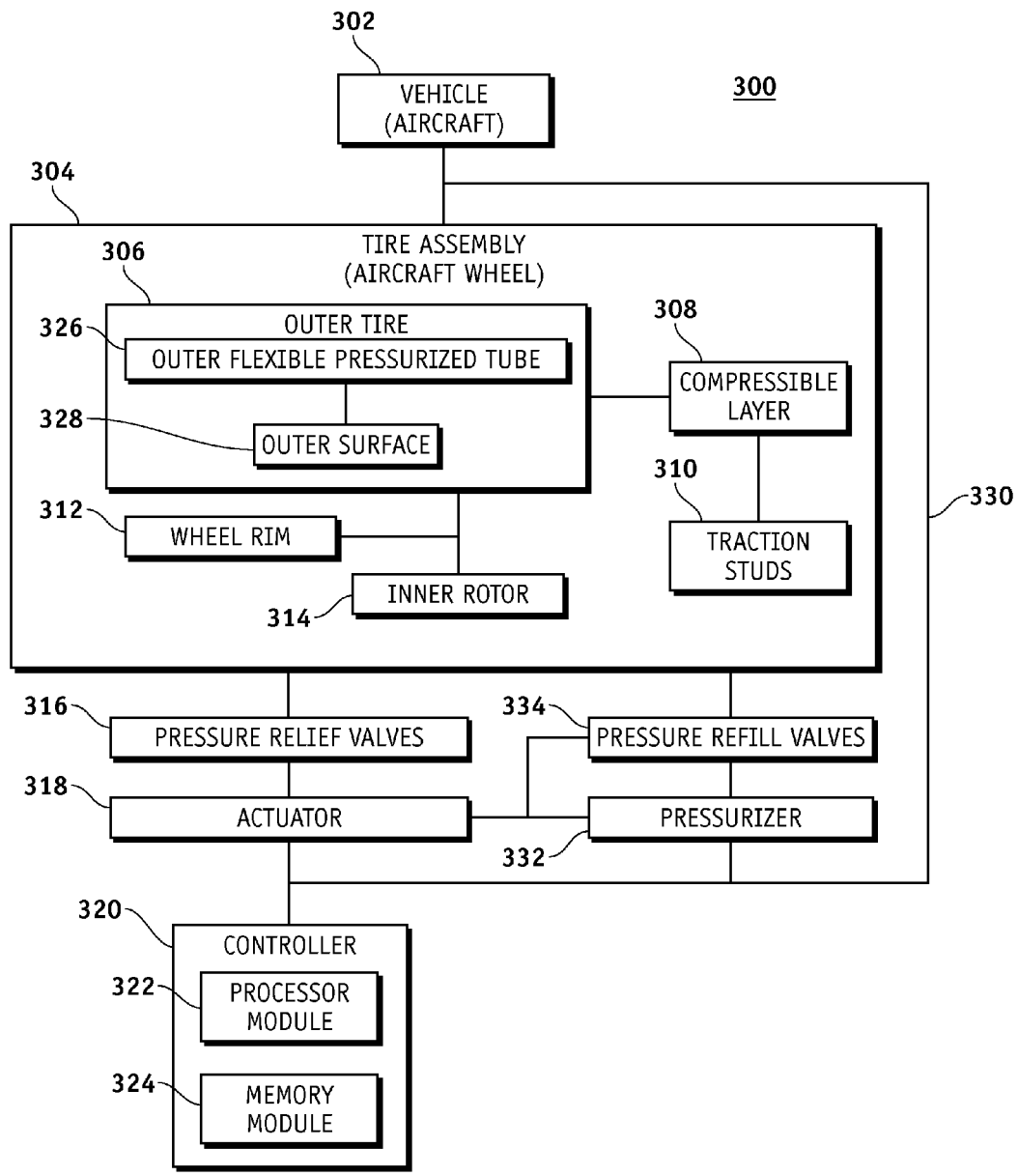
FIG. 3 is an illustration of an exemplary block diagram of a tire traction system according to an embodiment of the disclosure.

FIG. 3 is an illustration of an exemplary block diagram of a tire traction system (system 300) according to an embodiment of the disclosure. The system 300 may comprise a vehicle 302, a tire assembly 304, at least one pressure relief valve 316 (pressure relief valves 316), an actuator 318, a controller 320, and a pressurizer 332.

An aircraft 302 as an embodiment of the vehicle 302 is used in the following descriptions of embodiments of the disclosure.

The tire assembly 304 (aircraft wheel 304) is configured to couple to the aircraft 302. Tire assembly 304 and aircraft wheel 304 may be used interchangeably in this document. The tire assembly 304 comprises an outer tire 306, a compressible layer 308, a plurality of traction studs 310, a wheel rim 312, and an inner rotor 314.

The outer tire 306 is coupled to the wheel rim 312, and comprises an outer flexible pressurized tube 326 comprising an outer surface 328 configured to contact a contact surface 402 (FIG. 4) such as a landing surface. The landing surface may comprise, for example but without limitation, an icy runway, a muddy runway, an unimproved runway, and/or other landing surface.

In some embodiments, the outer tire 306 may comprise an internal impermeable layer (liner) (not shown) of special rubber on its inner surface which contains air or other inflating fluid within the outer tire 306. The internal impermeable liner may line a substantially entire interior surface of the outer tire 306. The internal impermeable liner may be considered to be a part of the outer tire 306. Thus, the inner rotor 314 may contact the outer tire 306 via the internal impermeable liner when the outer tire 306 is depressurized.

Figure 7:
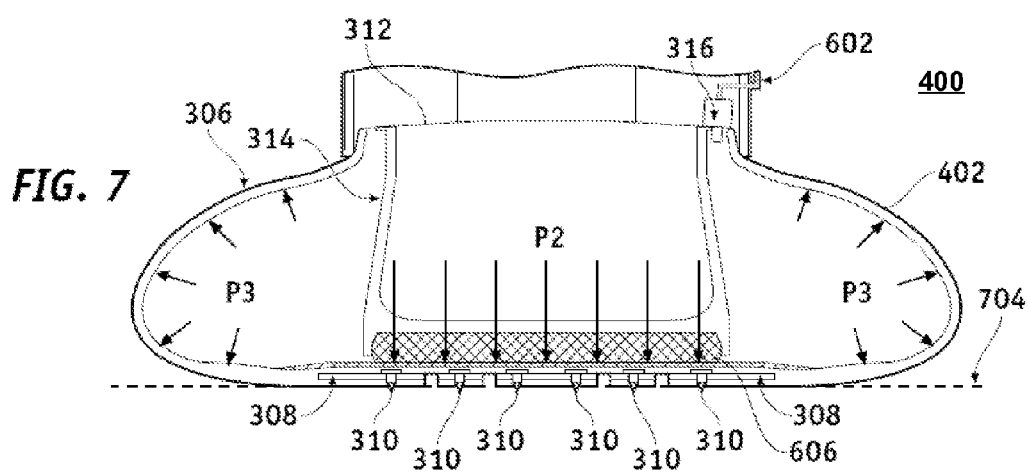
FIG. 7 is an illustration of an exemplary cross section of a tire traction system taken along a line A-A of FIG. 4 showing traction studs deployed when an outer tire is in a depressurized state according to an embodiment of the disclosure.

The compressible layer 308 comprises a layer of an elastic material located inside the outer tire 306 and around the traction studs 310 that is configured to compress under higher pressure such as pressure P2 in FIG. 7 to allow the traction studs 310 to protrude from the outer surface 328 of the outer tire 306. The compressible layer 308 may comprise, for example but without limitation, an elastomer, a vulcanized rubber, a foam rubber, a plastic foam, an air gap, a spring filled air gap, or other compressible material.

Figure 4:
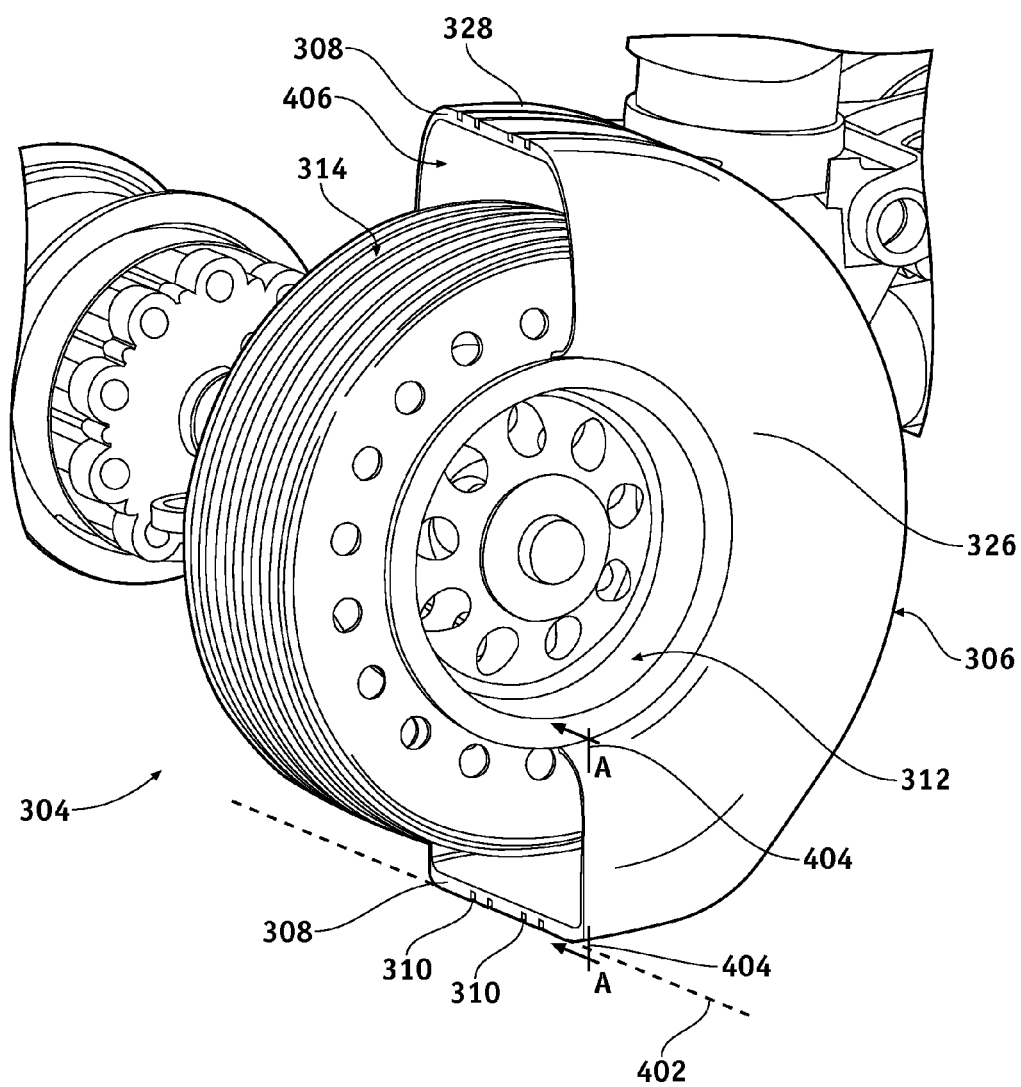
FIG. 4 is an illustration of an exemplary tire traction system comprising a lightweight stiff type of an inner rotor according to an embodiment of the disclosure.

The traction studs 310 are configured to protrude from the outer surface 328 of the outer tire 306 in response to the inner rotor 314 contacting the outer tire 306. The traction studs 310 are located inside the outer tire 306 and surrounded by the compressible layer 308. The traction studs 310 are inside or flush relative to the outer tire 306 contact surface 402 (FIG. 4). As the system 300 is activated, most of a landing weight (W) of the aircraft 302 distributed between main landing gear tires such as the outer tire 306 is concentrated on a central portion of the contact surface 704 (FIG. 7) such as a runway 704. As explained in more detail in the context of discussion of FIGS. 7 and 7A, because the pressure P2 from the inner rotor 314 on the runway 704 through the outer tire 306 is much higher than other portions of the outer tire 306 and is concentrated over a small area such as the area A2 (FIG. 7A), stud tips of the traction studs 310 deploy outside of the outer tire 306 to contact the runway 704. Contact surface 402 and runway 402 may be used interchangeably in this document. Similarly, contact surface 704 and runway 704 may be used interchangeably in this document.

The wheel rim 312 may comprise an aircraft wheel rim 312 coupled to the outer tire 306 and the inner rotor 314. Wheel rim 312 and aircraft wheel rim 312 may be used interchangeably in this document.

The inner rotor 314 is coupled to the wheel rim 312 and is located inside the outer flexible pressurized tube 326, the inner rotor 314 is configured to contact the outer tire 306 in response to a depressurized state (P3 in FIG. 7). The inner rotor 314 may comprise, for example but without limitation, a rigid structure, a semi-flexible structure, or other structure suitable for operation of the inner rotor 314.

The pressure relief valves 316 are configured to depressurize the outer tire 306 to the depressurized state (P3 in FIG. 7) comprising a reduced circumference of the outer tire 306 in response to a depressurization signal. The pressure relief valves 316 may be used to decrease pressure in the outer tire 306, so that the inner rotor 314 engages with the outer tire 306 from inside 406 (FIG. 4) of the outer tire 306, and rolls on the contact surface 402 such as the runway 402. The lower pressure (e.g., P3 in FIG. 7) may still stabilize the outer tire 306 from collapsing. The pressure relief valves 316 may be activated by an actuation command comprising the depressurization signal from the actuator 318. The depressurization signal is generated in response to a non-optimal landing condition of the aircraft 302.

In some embodiments where depressurization is very rapid and a high discharge flow rate is required to achieve the depressurized state (pressure P3 in FIG. 7) in a timely manner, the pressure relief valves 316 may comprise a substantial number and/or a substantial size. The pressure relief valves 316 may comprise, for example but without limitation, 3 to 4 orifice holes of about 6.35 mm (about 0.25 inches), 20 orifice holes of about 51 mm (about 2 inches) to about 127 mm (about 5 inches), or other configuration to achieve the depressurized state P3 in a timely manner.

The actuator 318 is configured to activate the pressure relief valves 316 for depressurizing the outer tire 306 to the depressurized state P3. The actuator 318 is also configured to activate the pressurizer 332. The actuator 318 may comprise, for example but without limitation, a linear hydraulic actuator, a ball screw actuator, or other actuator that is capable of actuating the pressure relief valves 316.

The pressurizer 332 is configured to re-pressurize the outer tire 306 to a pressurized state (P1 in FIG. 6) after a landing or after an attempted landing in response to an actuation from the actuator 318 when the outer tire 306 is in a reusable condition, thereby allowing repeatable emergency braking. The pressurizer 332 may be coupled to at least one pressure refill valve 334 for refilling the outer tire 306. The pressure refill valve(s) 334 may be activated by the actuator 318 to allow the pressurizer 332 to pump air into the outer tire 306. The pressurizer 332 may be located, for example but without limitation, onboard the vehicle 302, externally to the vehicle 302 (e.g., an air pump located on: ground, an air vehicle, a water vehicle or a ground vehicle), or other suitable location. The pressurizer 332 can pump air into the outer tire 306.

The controller 320 may comprise, for example but without limitation, a processor module 322, a memory module 324, or other module. The controller 320 may be implemented as, for example but without limitation, a part of an aircraft system, a centralized aircraft processor, a subsystem computing module comprising hardware and/or software devoted to the system 300, or other processor. The controller 320 may communicate with the pressure relief valves 316, the pressure refill valves 334, and other elements of the system 300 via a communication link 330.

The controller 320 is configured to control the pressure relief valves 316 to depressurize the outer tire 306 according to various operation conditions. The operation conditions may comprise, for example but without limitation, flight conditions, ground operations, or other condition. The flight conditions may comprise, for example but without limitation, landing, or other flight condition. The ground operations may comprise, for example but without limitation, air breaking after landing, taxing, parking, or other ground operation. The controller 320 may also be configured to control the pressure refill valves 334 to pressurize the outer tire 306 according to various operation conditions. The controller 320 may be located remotely from the tire assembly 304, or may be coupled to the tire assembly 304. In one embodiment, the controller 320 may be placed in a cockpit of the aircraft 302.

In operation, an airplane supplemental emergency braking system such as the system 300 may be activated in a non-optimal landing scenario by a pilot flying or a first officer. For example, the system 300 may be activated as weight on wheels is achieved and low friction surface conditions are detected, and a possible non-optimal operation of the aircraft 302 is determined to be probable due to over-running an end of the runway 402. The controller 320 or an activation device (not shown) for the controller 320 may be placed on a flight deck center aisle stand near thrust levers, since the controller 320 may be used in conjunction with thrust reversers when the aircraft 302 is so equipped. The controller 320 may also be duplicated on an outboard console in situations where the pilot flying calls for the first officer to manage an activation of the system 300.

The processor module 322 comprises processing logic that is configured to carry out the functions, techniques, and processing tasks associated with the operation of the system 300. In particular, the processing logic is configured to support the system 300 described herein. For example, the processor module 322 may direct the pressure relief valves 316 to depressurize the outer tire 306 based on various operation conditions.

The processor module 322 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 324 may comprise a data storage area with memory formatted to support the operation of the system 300. The memory module 324 is configured to store, maintain, and provide data as needed to support the functionality of the system 300. For example, the memory module 324 may store flight configuration data, the depressurization signal(s) for activation of the pressure relief valves 316, or other data.

In some embodiments, the memory module 324 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 324 may be coupled to the processor module 322 and configured to store, for example but without limitation, a database, and the like. Additionally, the memory module 324 may represent a dynamically updating database containing a table for updating the database, or other application. The memory module 324 may also store, a computer program that is executed by the processor module 322, an operating system, an application program, tentative data used in executing a program, or other application.

The memory module 324 may be coupled to the processor module 322 such that the processor module 322 can read information from and write information to the memory module 324. For example, the processor module 322 may access the memory module 324 to access an aircraft speed, an angle of attack, a Mach number, an altitude, or other data.

As an example, the processor module 322 and memory module 324 may reside in respective application specific integrated circuits (ASICs). The memory module 324 may also be integrated into the processor module 322. In an embodiment, the memory module 324 may comprise a cache memory for storing temporary variables or other intermediate information during execution of instructions to be executed by the processor module 322.

FIG. 4 is an illustration of an exemplary tire traction system 400 comprising a stiff lightweight type (rigid structure) of the inner rotor 314 according to an embodiment of the disclosure. FIG. 4 may have functions, material, and structures that are similar to the embodiments shown in FIG. 3. Therefore, common features, functions, and elements may not be redundantly described here. The system 400 comprises the outer tire 306, the compressible layer 308, the traction studs 310, the wheel rim 312, and the inner rotor 314. In FIG. 4, the inner rotor 314 comprises a rigid structure such as, but without limitation, a thick walled tire, a solid rubber tire, a solid composite tire, a solid metal tire, or other rigid tire configuration.

Figure 5:
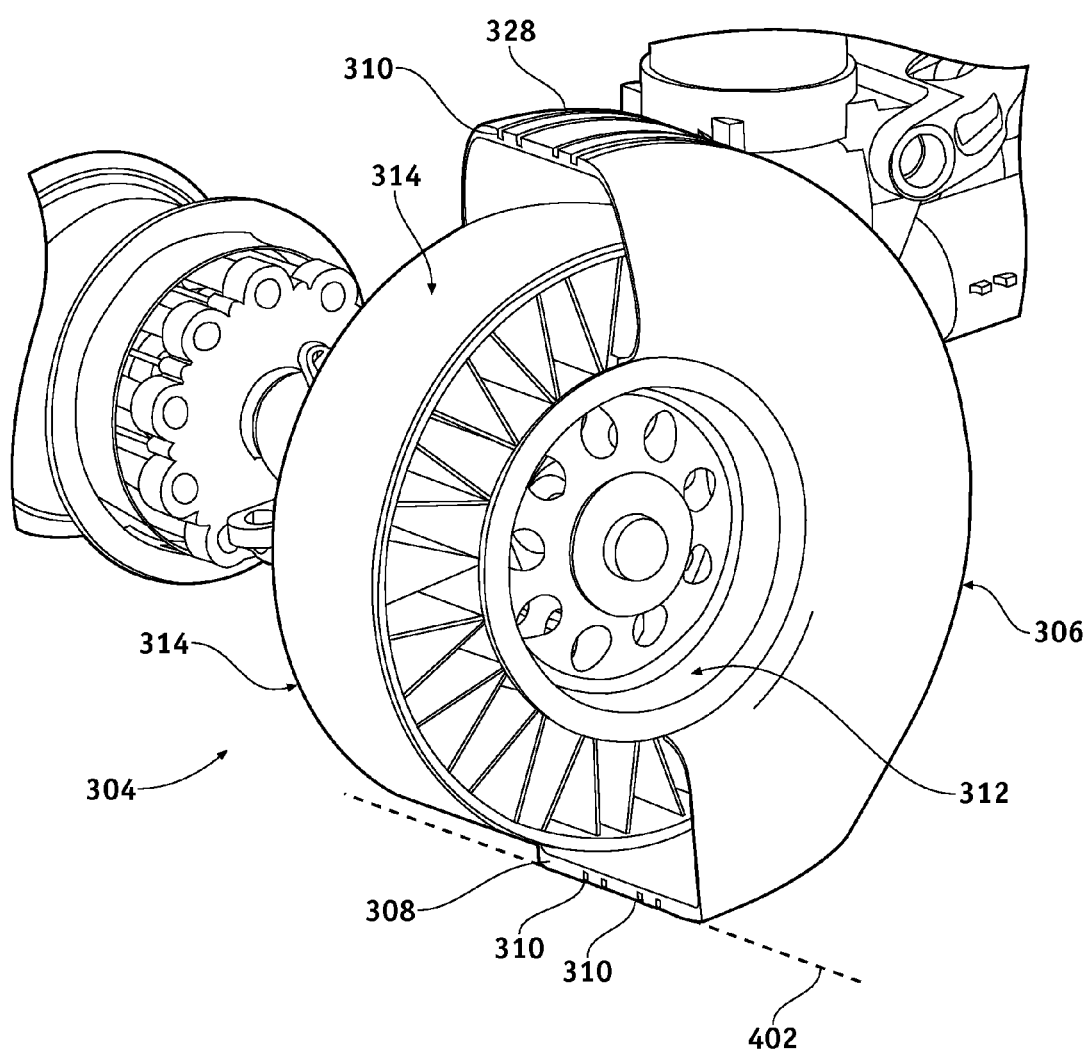
FIG. 5 is an illustration of an exemplary tire traction system comprising a lightweight "airless tire" type of an inner rotor according to an embodiment of the disclosure.

FIG. 5 is an illustration of an exemplary tire traction system 500 comprising a lightweight "airless tire" type (semi-flexible structure) of the inner rotor 314 according to an embodiment of the disclosure. FIG. 5 may have functions, material, and structures that are similar to the embodiments shown in FIG. 3. Therefore, common features, functions, and elements may not be redundantly described here. The system 500 comprises the outer tire 306, the compressible layer 308, the traction studs 310, the wheel rim 312, and the inner rotor 314. In FIG. 5, the inner rotor 314 comprises a semi-flexible structure such as, but without limitation, a composite rim comprising structural rib members coupled to the wheel rim 312, a semi-flexible rubber tire, a semi-flexible composite tire, a semi-flexible metal tire, or other semi-flexible tire configuration.

Figure 6:
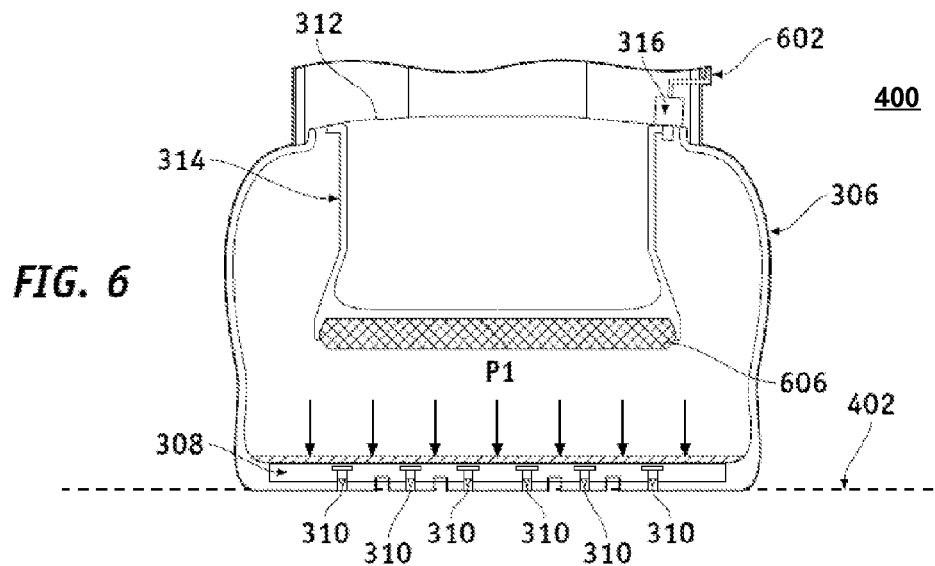
FIG. 6 is an illustration of an exemplary cross section of a tire traction system taken along a line A-A of FIG. 4 showing traction studs hidden when an outer tire is in a pressurized state according to an embodiment of the disclosure.

FIG. 6 is an illustration of an exemplary cross section of a tire traction system 400 taken along a line A-A 404 of FIG. 4 showing the traction studs 310 hidden when the outer tire 306 is in a pressurized state P1 (pressure P1, e.g., "normal tire pressure") according to an embodiment of the disclosure. The pressure relief valves 316 may be coupled to a communication link such as a signal cable 602 configured to send the actuation command comprising the depressurization signal from the actuator 318 to the pressure relief valves 316. In an embodiment, the inner rotor 314 may be coupled to a flexible band 606 around its peripheral. For example the inner rotor 314 comprising a rigid structure such as the "lightweight stiff type" shown in FIG. 4 may be coupled to the flexible band 606 around its peripheral, where the flexible band 606 is operable to restore the inner rotor 314.

FIG. 7 is an illustration of an exemplary cross section of a tire traction system 400 taken along the line A-A 404 of FIG. 4 showing the traction studs 310 deployed when the outer tire 306 is in the depressurized state P3 (pressure P3, e.g., "low tire pressure") according to an embodiment of the disclosure. The pressure P2 (pressure P2, e.g., "inner rotor pressure") from the inner rotor 314 on the outer tire 306 is much higher than the pressure P1. The compressible layer 308 is calibrated so that traction studs 310 are retracted under the pressure P1, and are deployed under pressure P2.

Figure 7A:
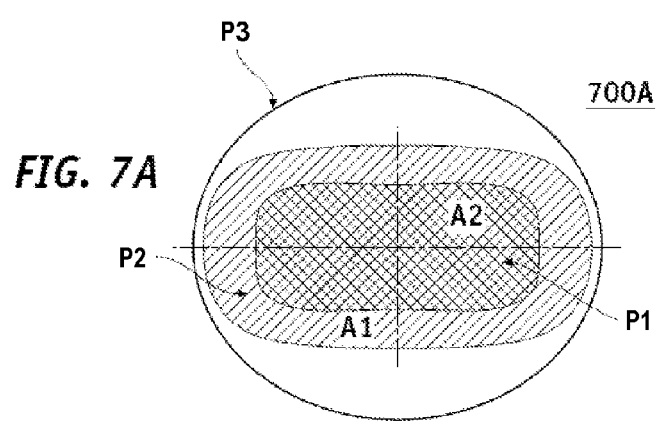
FIG. 7A is an illustration of a pressure growth on a studded portion of an outer tire comprising traction studs when air pressure in the outer tire decreases according to an embodiment of the disclosure.

FIG. 7A is an illustration of pressure growth 700A on a studded portion of the outer tire 306 comprising the traction studs 310 when air pressure in the outer tire 306 decreases according to an embodiment of the disclosure. A wheel ground contact area A1 comprises the contact surface 402 (FIG. 4) of the outer tire 306 (FIGS. 3-5) in the pressurized state P1 ("normal tire pressure"). A wheel ground contact area A2 represents where the inner rotor 314 contacts tread of the outer tire 306 in the depressurized state P3. Since the wheel ground contact area A2 (area A2) is smaller than the wheel ground contact area A1, the landing weight W of the aircraft 302 is distributed over a smaller area, i.e., the wheel ground contact area A2.

Thus, the pressure P2 applied to the flexible layer 308 increases based on W divided by the wheel ground contact area A2. A wheel ground contact area of the outer tire 306 under the pressure P3 ("low tire pressure") may be larger than the wheel ground contact area A1; however, generally a very small portion of the landing weight W (axial load) transfers through the wheel ground contact area of the outer tire 306 under the pressure P3.

Figure 8:
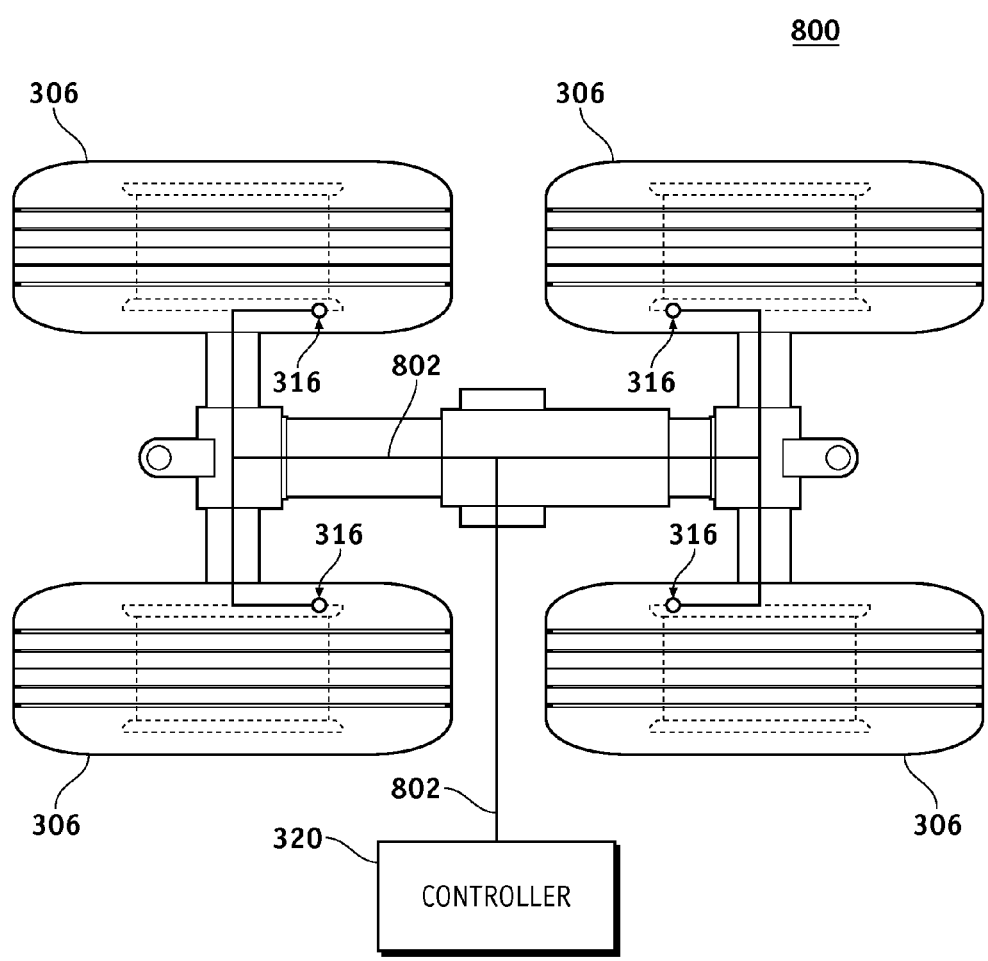
FIG. 8 is an illustration of an exemplary pressure relief valve activation system according to an embodiment of the disclosure.

FIG. 8 is an illustration of an exemplary pressure relief valve activation system 800 according to an embodiment of the disclosure. The supplemental emergency brake system activation system such as the system 300 can activate the pressure relief valves 316 via a control signal 802 (e.g., via the signal cable 602 in FIG. 6) for low pressure for all or some of the outer tires 306. The control signal 802 may be generated by the controller 320. The control signal 802 may comprise, for example but without limitation, a mechanical signal generated by mechanical means, an electric signal generated by electronic means, a magnetic signal generated by an electromagnetic means, a wireless signal generated by a wireless electronic means, or other signal type that may be generated by other means. The controller 320 may be activated from a flight deck of the aircraft 302.

Figure 9:
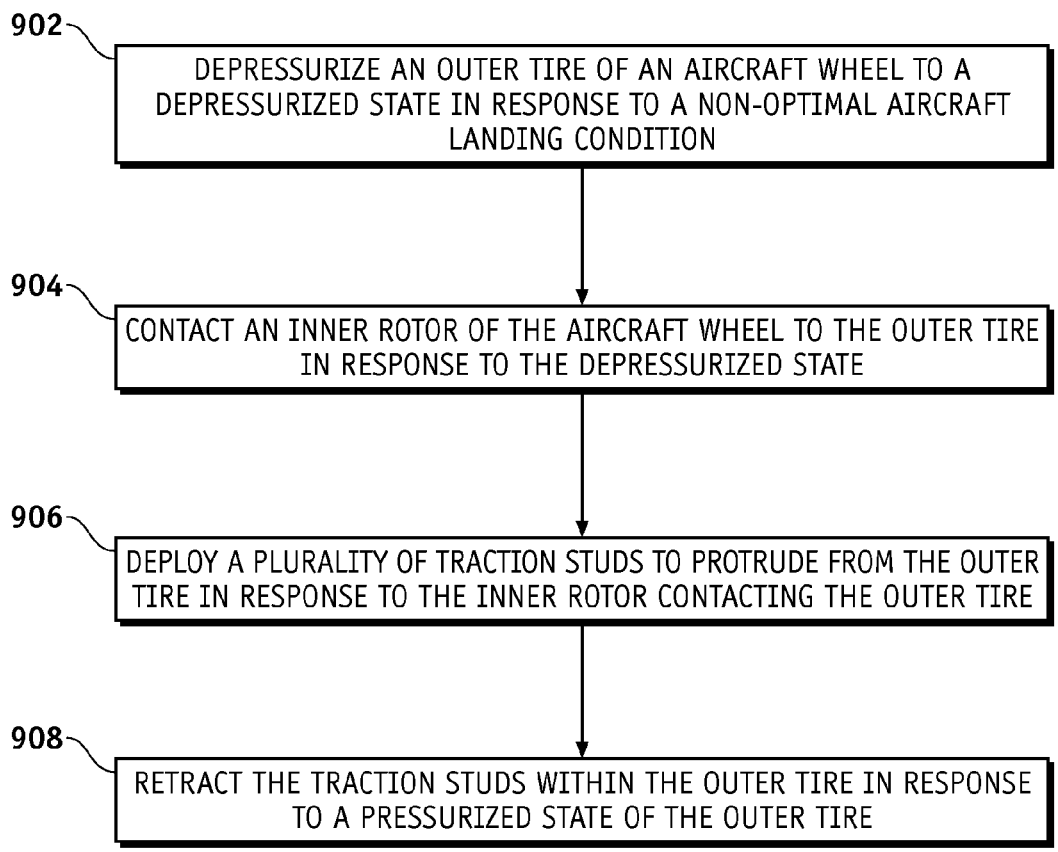
FIG. 9 is an illustration of an exemplary flowchart showing a process for controlling tire traction according to an embodiment of the disclosure.

FIG. 9 is an illustration of an exemplary flowchart showing a process 900 for controlling landing tire traction according to an embodiment of the disclosure. The various tasks performed in connection with process 900 may be performed mechanically, by software, hardware, firmware, computer-readable software, computer readable storage medium, or any combination thereof. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

For illustrative purposes, the following description of process 900 may refer to elements mentioned above in connection with FIGS. 1-8. In some embodiments, portions of the process 900 may be performed by different elements of the system 300 such as: the vehicle 302, the tire assembly 304, the pressure relief valves 316, the actuator 318, the controller 320, etc. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

Process 900 may begin by depressurizing an outer tire such as the outer tire 306 of an aircraft wheel such as the tire assembly 304 to a depressurized state such as the depressurized state P3 in response to an aircraft non-optimal landing condition (task 902). The non-optimal condition may comprise, for example but without limitation, a wet runway or a runway covered in snow, ice, strong winds or other non-optimal landing condition. For example, a runway comprising a non-optimal condition may comprise a low coefficient of friction (e.g., less than 0.1).

Process 900 may continue by contacting an inner rotor such as the inner rotor 314 of the aircraft wheel (tire assembly 304) to the outer tire 306 in response to the depressurized state P3 (task 904).

Process 900 may continue by deploying a plurality of traction studs such as the traction studs 310 to protrude from the outer tire 306 in response to the inner rotor 314 contacting the outer tire 306 (task 906).

Process 900 may continue by retracting the traction studs 310 within the outer tire 306 in response to a pressurized state such as the pressurized state P1 of the outer tire 306 (task 908).

Figure 10:
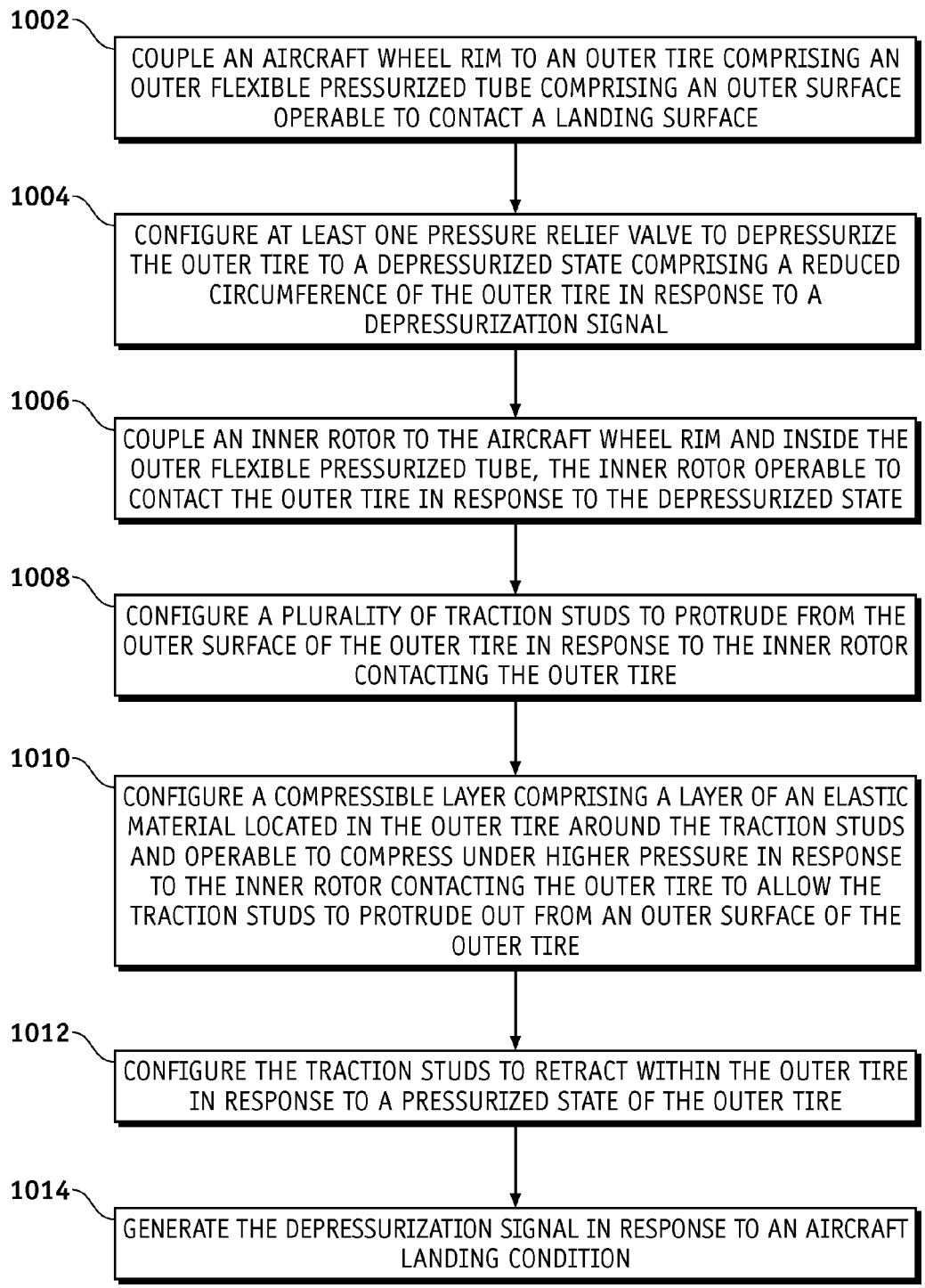
FIG. 10 is an illustration of an exemplary flowchart showing a process for forming a tire traction system according to an embodiment of the disclosure.

FIG. 10 is an illustration of an exemplary flowchart showing a process 1000 for providing a landing tire traction according to an embodiment of the disclosure. The various tasks performed in connection with process 1000 may be performed mechanically, by software, hardware, firmware, computer-readable software, computer readable storage medium, or any combination thereof. It should be appreciated that process 1000 may include any number of additional or alternative tasks, the tasks shown in FIG. 10 need not be performed in the illustrated order, and the process 1000 may be incorporated into a more comprehensive procedure or process having additional functionality not described in detail herein.

For illustrative purposes, the following description of process 1000 may refer to elements mentioned above in connection with FIGS. 1-8. In some embodiments, portions of the process 1000 may be performed by different elements of the system 300 such as: the vehicle 302, the tire assembly 304, the pressure relief valves 316, the actuator 318, the controller 320, etc. It should be appreciated that process 1000 may include any number of additional or alternative tasks, the tasks shown in FIG. 10 need not be performed in the illustrated order, and the process 1000 may be incorporated into a more comprehensive procedure or process having additional functionality not described in detail herein.

Process 1000 may begin by coupling an aircraft wheel rim such as the wheel rim 312 to an outer tire such as the outer tire 306 comprising an outer flexible pressurized tube such as the outer flexible pressurized tube 326 comprising an outer surface such as the outer surface 328 operable to contact a landing surface such as the landing surface 704 (task 1002).

Process 1000 may continue by configuring at least one pressure relief valve such as the pressure relief valves 316 to depressurize the outer tire 306 to a depressurized state such as the depressurized state P3 comprising a reduced circumference of the outer tire 306 in response to a depressurization signal (task 1004).

Process 1000 may continue by coupling an inner rotor such as the inner rotor 314 to the aircraft wheel rim 312 and inside the outer flexible pressurized tube such as the inside 406, the inner rotor 314 operable to contact the outer tire 306 in response to the depressurized state P3 (task 1006).

Process 1000 may continue by configuring a plurality of traction studs such as the traction studs 310 to protrude from the outer surface 328 of the outer tire in response to the inner rotor 314 contacting the outer tire 306 (task 1008).

Process 1000 may continue by configuring a compressible layer such as the compressible layer 308 comprising a layer of an elastic material located in the outer tire 306 around the traction studs 310 and operable to compress under higher pressure in response to the inner rotor 314 contacting the outer tire 306 to allow the traction studs 310 to protrude out from the outer surface 328 of the outer tire 306 (task 1010).

Process 1000 may continue by configuring the traction studs 310 to retract within the outer tire 306 in response to a pressurized state such as the pressurized state P1 of the outer tire 306 (task 1012).

Process 1000 may continue by generating the depressurization signal in response to an aircraft landing condition (task 1014).

In this way, embodiments of the disclosure provide a means for better landing gear traction upon landing on contaminated runways. A supplemental braking system is primarily for use in emergency situations such as low traction conditions when conventional brakes on the main landing gear may be ineffective. The supplemental braking system is also applicable to situations when overrunning an end of a runway is unavoidable. Such a condition may occur when landing long with insufficient run out to accommodate normal braking procedures. Alternatively, a condition may occur when less than optimal brake capacity is realized, in which case a crew and aircraft may face an undesirable situation without this supplemental emergency braking system.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-8 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, storage unit, or other non-transitory media. These and other forms of computer-readable media may be involved in storing one or more instructions for use by the processor module 322 to cause the processor module 322 to perform specified operations. Such instructions, generally referred to as "computer program code" or "program code" (which may be grouped in the form of computer programs or other groupings), when executed, enable the system 300.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for landing gear tire traction control, the method comprising:
    depressurizing an outer tire of an aircraft wheel to a depressurized state in response to a non-optimal aircraft landing condition;
    contacting an inner rotor of the aircraft wheel to the outer tire in response to the depressurized state;
    locating a plurality of traction studs in their entirety inside tread of the outer tire; and
    deploying the traction studs to protrude from the outer tire in response to the inner rotor contacting the outer tire.

2. The method of claim 1, further comprising retracting the traction studs within the outer tire in response to a pressurized state of the outer tire.

3. The method of claim 1, further comprising a compressible layer comprising a layer of an elastic material located in the outer tire around the traction studs and operable to compress under higher pressure in response to the inner rotor contacting the outer tire to allow the traction studs to protrude out from an outer surface of the outer tire.

4. The method of claim 1, further comprising re-pressurizing the outer tire after one of: a landing, and an attempted landing.

5. The method of claim 1, wherein the inner rotor comprising one of: a rigid structure, and a semi-flexible structure.

6. The method of claim 5, wherein the inner rotor comprises a flexible band coupled to the rigid structure.

7. A method for forming a landing gear tire traction control system, the method comprising:
    coupling an aircraft wheel rim to an outer tire comprising an outer flexible pressurized tube comprising an outer surface operable to contact a landing surface;
    configuring at least one pressure relief valve to depressurize the outer tire to a depressurized state comprising a reduced circumference of the outer tire in response to a depressurization signal;
    coupling an inner rotor to the aircraft wheel rim and inside the outer flexible pressurized tube, the inner rotor operable to contact the outer tire in response to the depressurized state; and
    configuring a plurality of traction studs to protrude from the outer surface of the outer tire in response to the inner rotor contacting the outer tire, wherein the traction studs are located in their entirety inside tread of the outer tire.

8. The method of claim 7, further comprising configuring a compressible layer comprising a layer of an elastic material located in the outer tire around the traction studs and operable to compress under higher pressure in response to the inner rotor contacting the outer tire to allow the traction studs to protrude out from the outer surface of the outer tire.

9. The method of claim 7, further comprising configuring the traction studs to retract within the outer tire in response to a pressurized state of the outer tire.

10. The method of claim 7, further comprising generating the depressurization signal in response to an aircraft landing condition.

11. A landing gear tire traction system comprising:
an aircraft wheel rim;
an outer tire coupled to the aircraft wheel rim, and comprising an outer flexible pressurized tube comprising an outer surface operable to contact a landing surface;
at least one pressure relief valve configured to depressurize the outer tire to a depressurized state comprising a reduced circumference of the outer tire in response to a depressurization signal;
an inner rotor coupled to the aircraft wheel rim and located inside the outer flexible pressurized tube, the inner rotor operable to contact the outer tire in response to the depressurized state; and
a plurality of traction studs configured to protrude from the outer surface of the outer tire in response to the inner rotor contacting the outer tire, wherein the traction studs are located in their entirety inside tread of the outer tire.

12. The landing gear tire traction system of claim 11, wherein the traction studs are operable to retract within the outer tire in response to a pressurized state of the outer tire.

13. The landing gear tire traction system of claim 11, wherein the depressurization signal is generated in response to an aircraft landing condition.

14. The landing gear tire traction system of claim 11, further comprising a pressurizer operable to re-pressurize the outer tire after one of: a landing, and an attempted landing.

15. The landing gear tire traction system of claim 11, further comprising a compressible layer comprising a layer of an elastic material located in the outer tire around the traction studs and operable to compress under higher pressure in response to the inner rotor contacting the outer tire to allow the traction studs to protrude out from the outer surface of the outer tire.

16. The landing gear tire traction system of claim 15, wherein the compressible layer comprises at least one member selected from the group consisting of: an elastomer, a vulcanized rubber, a foam rubber, a plastic foam, an air gap, and a spring filled air gap.

17. The method of claim 1, further comprising configuring the traction studs to be flush relative to a contact surface of the outer tire.

18. The method of claim 3, further comprising calibrating the compressible layer so that the traction studs are retracted under normal tire pressure, and are deployed under a pressure of the inner rotor.

19. The method of claim 18, wherein the pressure of the inner rotor applied to the compressible layer increases based on landing weight divided by wheel ground contact area.

20. The method of claim 8, further comprising calibrating the compressible layer so that the traction studs are retracted under normal tire pressure, and are deployed under a pressure of the inner rotor.

* * * * *